United States Patent Office 3,439,772
Patented Apr. 22, 1969

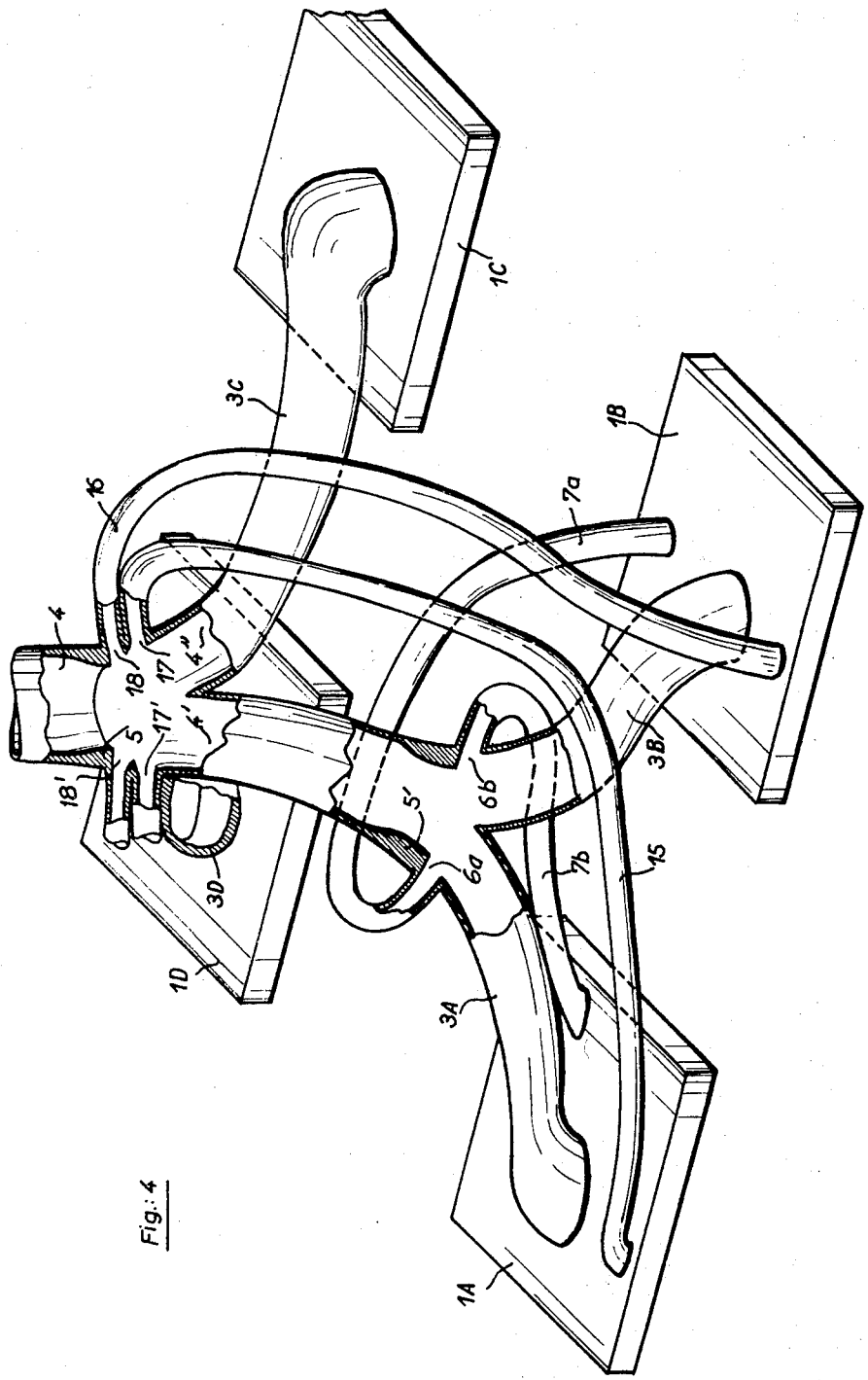

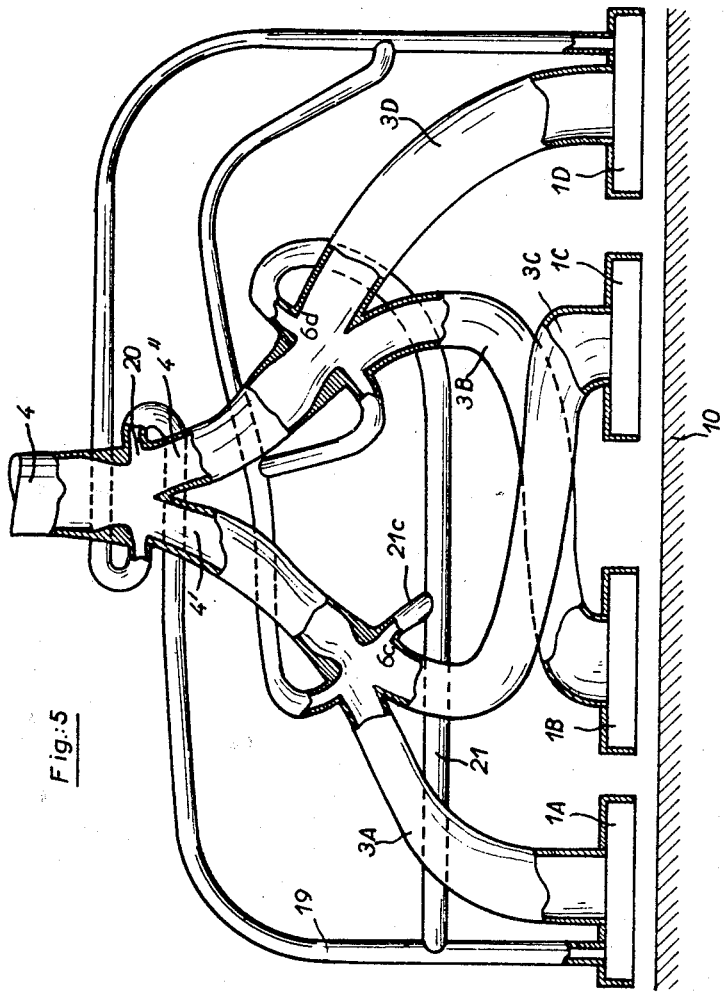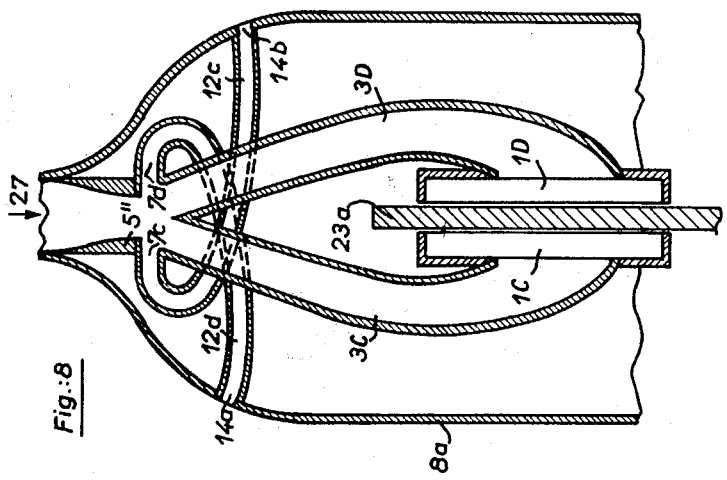

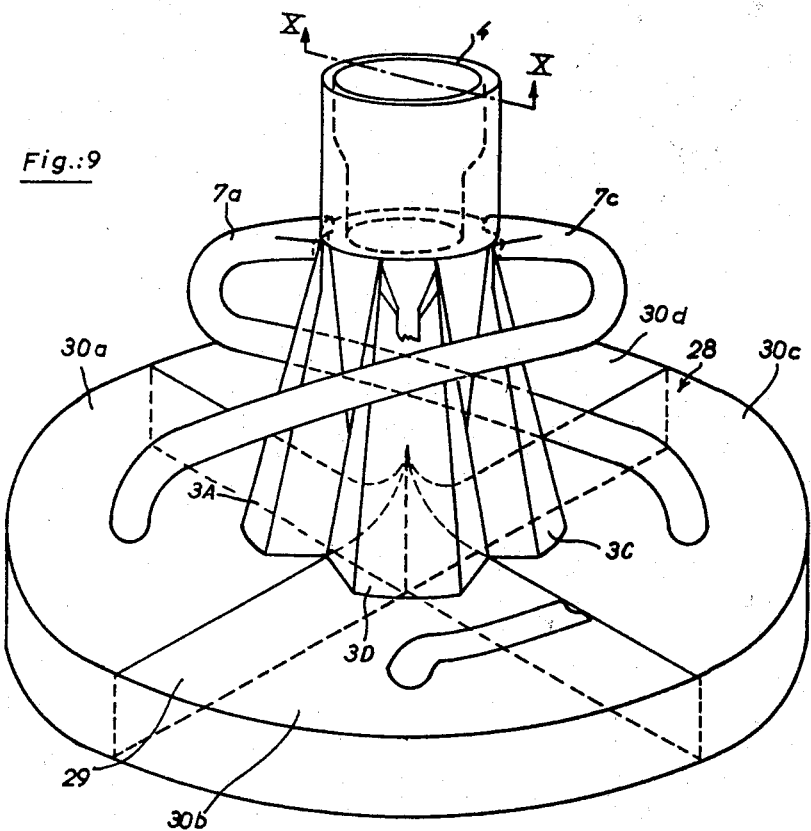
Fig.:9
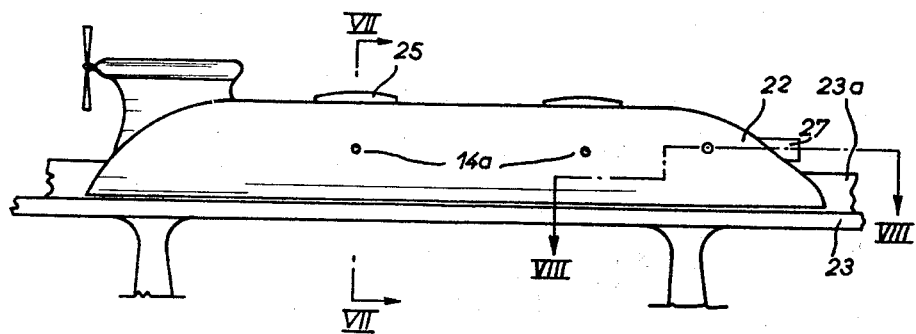
Fig.:6
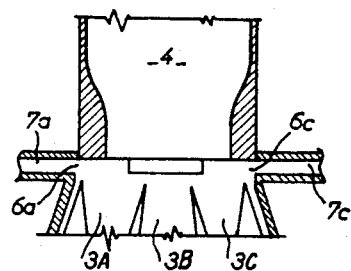
Fig.:10

3,439,772
SURFACE EFFECT DEVICES WITH FLUID
AMPLIFIER STABILIZING MEANS
Francois Louis Giraud, Plaisir, France, assignor to Bertin et Compagnie, Paris, France, a company of France
Filed Dec. 27, 1966, Ser. No. 604,820
Claims priority, application France, Dec. 29, 1965, 44,183
Int. Cl. B60v 1/00, 3/04
U.S. Cl. 180—118       11 Claims

ABSTRACT OF THE DISCLOSURE

Attitude control system for multi-cushion ground-effect machines with spaced cushions supplied with pressure fluid through a fluid amplifier device adapted for proportioning the respective supply flows, said fluid amplifier device being under the control of attitude sensing means such as cushion pressure sensors, the arrangement being such as to privilege one cushion and prejudice another cushion in order to restore the correct attitude whenever there is a departure therefrom.

---

This invention relates to vehicles borne and/or guided by pressure-fluid cushions.

Irregularities in the ground or aerodynamic pressures may cause a vehicle of the kind specified to roll and pitch and/or yaw. It is an object of this invention to compensate for such pitching, rolling and/or yawing.

According to the invention, to obtain such attitude control, the respective supply flows of the cushions are varied in accordance with change in attitude of the machine which affects their daylight clearances relatively to the surface against which they are formed, and therefore also the instantaneous cushion pressures.

It is an object of this invention to distribute and proportion the respective cushion supply flows by means of a fluid amplifier device under the control of machine attitude sensing means.

It is another object of this invention to provide this fluid amplifier device with control slots operating pneumatically to modify the distribution of supply flows to respective cushions by privileging one cushion and prejudicing another cushion.

A further object of this invention is to operate automatically such fluid amplifier control slots from pressure sensors or taps positioned at convenient points such as the cushion space and/or the machine outer walls.

Of course, action on the supply flow can be achieved by means of shutters or the like instead of a pressure applied through a control slot.

For a better understanding of the invention and to show how the same may be carried into effect, reference may now be made to the accompanying drawings wherein:

FIGURE 4 is a perspective view of a system according to the invention applied to a set of four-fluid cushions;

FIGURE 5 is an alternative form of the device shown on FIGURE 4;

FIGURE 6 is a side view of a vehicle which has fluid cushions and which is associated with a guide track;

FIGURES 7 and 8 are vertical and horizontal sections taken respectively along lines VII—VII and VIII—VIII of FIGURE 6;

FIGURE 9 is a perspective view showing the invention applied to a skirt subdivided into partitioned cells;

FIGURE 10 is a partial section on the line X—X of FIGURE 9, and

Figure 1:
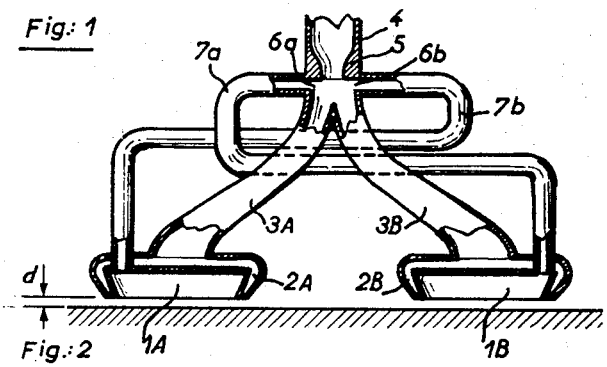
FIGURE 1 shows a system according to the invention applied to a vehicle borne by cushions, at least one pair of which is supplied from a single duct and which are produced by annular nozzles delivering a fluid curtain, the system being shown in elevation and partly sectioned.

Referring to FIGURE 1, the vehicle is borne by two gas cushions 1A, 1B, which are produced in known manner by two annular nozzles 2A, 2B. The nozzles are supplied with compressed air by ducts 3A, 3B connected to the output of a source (not shown) by a duct 4 comprising a convergent section 5 for accelerating the pressure fluid. Immediately downstream of the convergent section 5 are two slots 6a, 6b, slot 6a being near duct 3A and slot 6b being near duct 3B. Slot 6a is connected to cushion 1B by a tube 7a, and slot 6b is connected to cushion 1A by a tube 7b. In this embodiment, the cross-sectional areas of the supply ducts 3A, 3B respectively are substantially the same and their sum is substantially equal to the cross-sectional area of the duct 4. In normal operation the deliveries to the two ducts 3A, 3B are substantially identical.

The supply duct 4 with its convergent section 5, the two branched ducts 3A, 3B, the two control slots 6a, 6b, form together a fluid amplifier device operating in a well known manner as follows:

If, due to an increase in load above, say, the left-hand cushion 1A, the machine slightly tilts counterclockwise, nozzle 2A moves closer to the ground, the daylight clearance $d$ decreases and that fraction of the gas curtain issuing from the annular nozzle 2A which feeds cushion 1A increases, so that the pressure thereof increases. The reverse situation applies, of course, to the right-hand cushion 1B since its nozzle 2B moves away from the ground. The pressure increase in cushion 1A and the pressure decrease in cushion 1B are sensed by the pressure pick-up tubes 7b, 7a respectively and applied to slots 6b, 6a, so that a transverse pressure gradient occurs across the intake section of the branched ducts 3A, 3B. More specifically, slot 6b exerts a leftward blowing effect on the fluid flow delivered by the supply duct 4–5 and slot 6a exerts a like leftward suction effect thereon. Thus, the supply fluid is urged leftwards towards the inlet of duct 3A and away from the inlet of duct 3B, which amounts in practice to an increase in the relative effective area of duct 3A and a decrease in the relative effective area of duct 3B.

The result of this fluid amplifer action is eventually to increase the pressure in cushion 1A and to decrease it in cushion 1B, with the effect of tilting back the machine clockwise, and so the increased load on the cushion 1A is compensated for.

Figure 2:
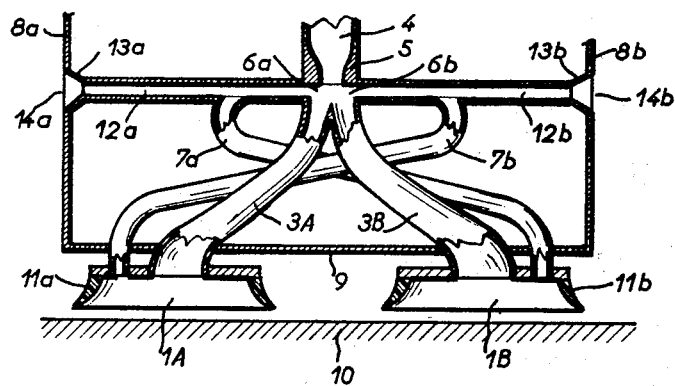
FIGURE 2 is a sectioned view of a system according to the invention applied to a vehicle borne by fluid cushions each bounded by a skirt having flexible walls.

In FIGURE 2, the vehicle comprises two side walls 8a, 8b and a bottom surface 9 and is lifted above the ground 10 by an even number of fluid cushions formed in plenum chambers distributed symmetrically about the vehicle longitudinal central plane. The figure shows two of these cushions 1A, 1B each bounded by a flexible skirt 11a, 11b. The cushions are supplied with pressure fluid through respective ducts 3A, 3B associated with a fluid amplifier as in the previous embodiment except that, in addition, two tubes 12a, 12b branch off from the tubes 7a, 7b respectively and extend to the vehicle side surfaces, with the interposition of parts 13a, 13b which are convergent from the outside towards the inside of the vehicle.

When the cushion 1A moves towards the ground 10, its daylight clearance decreases and the pressure therein increases. The pressure increase is transmitted to slot 6b through tube 7b and the fluid amplifier device operates as described above in order to restore the daylight clearance from the cushion 1a to its original value.

When the vehicle experiences aerodynamic pressures on its side surfaces, such pressures are detected by orifices 14a, 14b in the vehicle side surfaces. For instance, when the pressure acting on surface 8b increases, the vehicle tends to tilt so that cushion 1A moves towards the ground. The pressure increase is transmitted to slot 6b through tube 12b which supplies slot 6b, with the result that, as before the rate of flow through duct 3B decreases and the rate of flow through duct 3A increases, to compensate for the effects of the increased pressure acting on the vehicle side surface 8b. The supply to the cushions depends upon the difference between the pressures transmitted to the two control slots.

This embodiment helps to reduce vehicle tilting.

Figure 3:
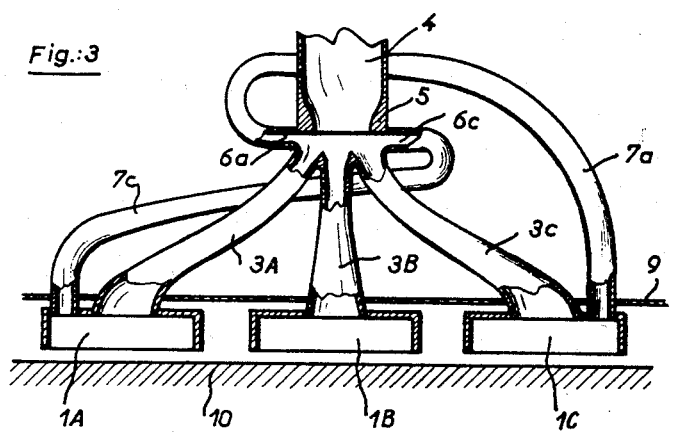
FIGURE 3 shows a system according to the invention applied to a group of three-fluid cushions.

FIGURE 3 shows a vehicle borne on a surface 10 with the interposition of three air cushions 1A, 1B, 1C supplied evenly through three ducts 3A, 3B, 3C from a duct 4. Two tubes 7a, 7c connect slots 6a, 6c respectively to the cushion 1C, 1A respectively.

When the skirt of cushion 1C moves towards the surface 10, the leakage from cushion 1C decreases and the pressure therein rises. This pressure variation is transmitted through tube 7a to slot 6a. The rates of flow in the ducts 3A, 3B, 3C alter, the rate of flow in duct 3C increasing and the rate of flow in duct 3A decreasing, so that the skirts tend to return to their normal position relatively to the surface 10.

FIGURE 4 shows a system according to the invention applied to a vehicle borne by four air cushions 1A, 1B, 1C, 1D bounded by skirts. The cushions 1A, 1B are supplied with air from ducts 3A, 3B branching off from a duct 4' comprising a convergent section 5' for accelerating the pressure fluid. Similarly, the cushions 1C, 1D are supplied with compressed air from ducts 3C, 3D branching off from a duct 4" comprising a convergent section for accelerating the pressure fluid. The ducts 4', 4" themselves branch off a duct 4 connected to air-compressing means. The duct 4 comprises a convergent section 5 for accelerating the compressed air. Cushion 1A is connected by a tube 7b to a slot 6b disposed downstream of convergent section 5' near duct 3B and, by a tube 15, to a slot 17 disposed downstream of convergent section 5 near duct 4". Cushion 1b is connected by a tube 7a to a slot 6a disposed downstream of convergent section 5' near duct 3A and, by a tube 16, to a slot 18 disposed downstream of convergent section 5 adjacent duct 4". Cushions 1C, 1D are each connected similarly to a slot disposed downstream of the convergent section in duct 4" and to another slot 17' or 18' disposed downstream of convergent section 5 near duct 4'.

When cushion 1a moves towards surface 10, the pressure in it rises. This pressure increase is transmitted through tubes 7b, 15. Slots 6b, 17 deliver fluid screens or curtains which reduce the effective cross-sectional areas in the duct 4" and duct 3B and increase the effective passage in duct 4' and duct 3A, thus compensating for the load forces which have shifted the cushion 1a towards the surface 10.

FIGURE 5 shows a system comprising two stages of control. When cushion 1A moves towards surface 10, the daylight clearance from cushion 1A decreases and the pressure in cushion 1A increases. The pressure increase is transmitted through tube 19 which supplies slot 20. The same delivers a fluid barrier which reduces the effective area of duct 4". The rate of flow in duct 4' increases; simultaneously, the rate of flow in duct 4" decreases.

The pressure in cushion 1A also produces a control flow through tube 21 which has a branch 21c supplying slot 6c. The same delivers a fluid barrier which reduces the effective area in duct 3C. The rate of flow in duct 3A is increased; simultaneously, the rate of flow in duct 3C in decreased. Duct 21 also supplies slot 6d delivering a fluid barrier which reduces the effective area in duct 3D. The rate of flow in duct 3B increases; simultaneously, the rate of flow in duct 3D decreases.

Consequently, cushion 1b co-operates with cushion 1A to compensate for forces tending to tilt the machine from its normal attitude.

Figure 7:
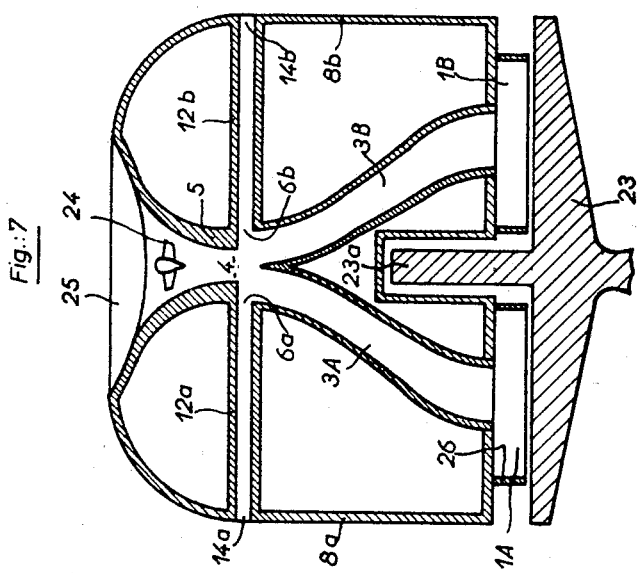

FIGURES 6, 7 and 8 show the invention applied to a vehicle 22 borne and guided by a track 23. The fluid cushions 1A, 1B are supplied, for instance, from a compressor 24 which sucks air at 25 and discharges into a fluid amplifier device as before: supply duct 4 with a convergent section 5, branched ducts 3A, 3B which supply compressed air to the cushions 1A, 1B which are bounded by preferably flexible skirts 26. Two tubes 12a, 12b connect the control slots 6a, 6b to orifices, as 14a, 14b, in the vehicle side walls 8a, 8b. Cushion supply is therefore controlled by aerodynamic pressures acting on the vehicle outer surface.

The vehicle is guided about the central portion 23a of the track by compressed-air cushions 1C, 1D supplied, for instance, by a ramming intake 27 at the front of the vehicle, the air being accelerated in a convergent section 5" when the vehicle is in movement. In normal operation the rates of flow through the ducts 3C, 3D are substantially identical.

When the wall 8a experiences aerodynamic pressures, the same act on orifice 14a and produce a control flow in the tube 12d which supplies the deflection slot 7d to reduce the effective area of duct 3D. The rates of flow through the ducts 3C, 3D alter, the rate of flow through duct 3C increasing simultaneously as the rate of flow through duct 3D decreases, so that compensation is provided for the pressures acting on the vehicle wall 8a. This action based on the guide cushions can be combined with the action of the lift cushions 1A, 1B whose supply is for this purpose modified as described in connection with the embodiment shown in FIGURE 2.

FIGURE 9 shows a skirt 28 which partitions 29 subdivide into a number of cells—four in the particular example shown. The cells 30a, 30b, 30c, 30d are supplied with compressed air from a single duct 4 from which passages 3A, 3B, 3C, 3D branch off. The complete system has two planes of symmetry which are perpendicular to one another.

When cell 30a moves towards the ground, the daylight clearance from cell 30a decreases and the pressure in cell 30a increases. The pressure increase leads to a control flow in tube 7c supplying slot 6c (FIGURE 10), with the result that the distribution of flow as between the passages 3 alters. The increased flow through the duct 3A tends to make cell 30a return to its normal position.

In the event of a negative pressure in cell 30c corresponding to an extra pressure in cell 30a, such negative pressure is transmitted to slot 6a. The pressure difference between slots 6a and 6c and the flow difference as between the cells 30a and 30c increases to increase the restoring forces acting on the vehicle.

Figure 11:
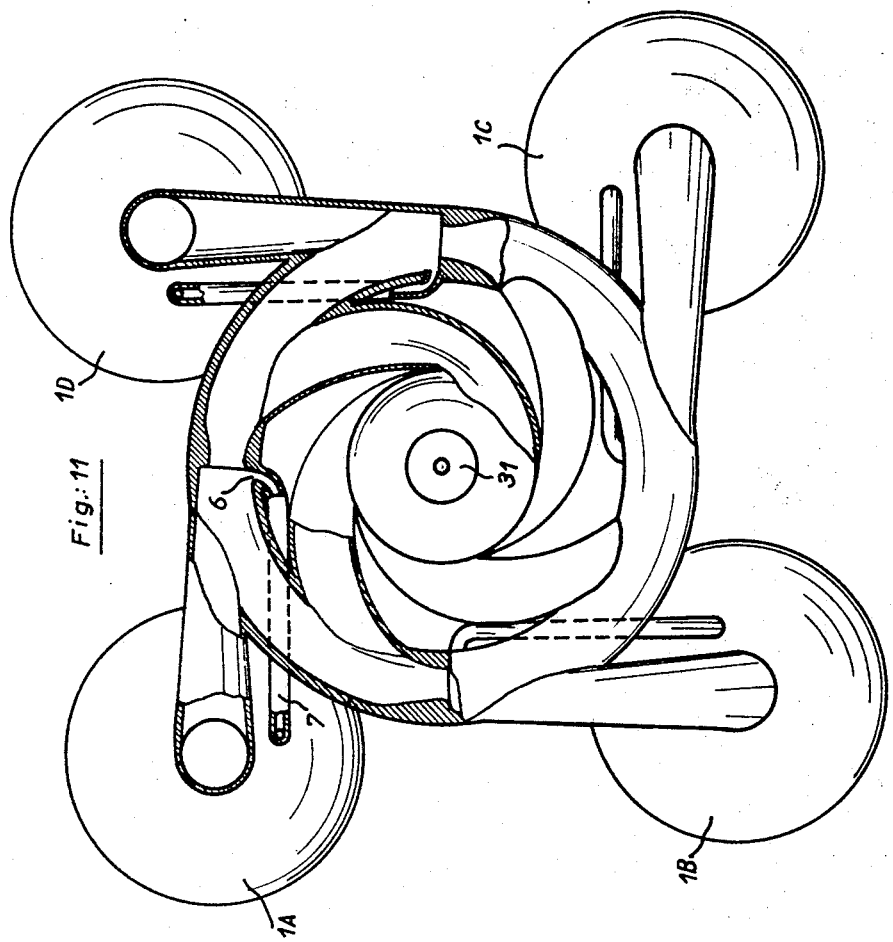
FIGURE 11 shows another embodiment of the invention.

Referring to FIGURE 11, the vehicle is borne by four cushions 1A, 1B, 1C, 1D supplied by a centrifugal compressor 31. When cushion 1A moves towards the ground, its pressure increases and tube 7 transmits a control flow to slot 6, so that the rate of air flow to the cushion 1A increases and the rate of air flow to the other cushions decreases, an event which helps to compensate for the loading of the cushion 1a.

What is claimed is:
1. In a surface effect machine movable along an adjacent surface with the interposition of spaced, pressure fluid cushions formed against said surface and fed by respective ducts branching from a junction with pressure fluid supply means, a system for controlling the attitude of said machine about at least one axis thereof relative to said surface comprising a fluid amplifier device operating at said junction for proportioning the supply flow from said pressure fluid supply means between said branching ducts, means sensing any departure from a predetermined attitude of said machine about said axis relative to said adjacent surface and generating a pneumatic signal corresponding to such departure, and piping means extending between and in open communication with both said attitude sensing means and said fluid amplifier device for transmitting to said amplifier device said pneumatic signal and putting said fluid amplifier device under the control of said attitude sensing means, whereby said fluid amplifier device increases the supply flow proportion attributed to one of said branching ducts and decreases that attributed to the other so as to counteract said attitude departure.

2. Surface effect machine as claimed in claim 1, wherein said attitude sensing means comprises pressure sensor means for generating a pressure signal to be applied to said fluid amplifier device, whereby a flow control pressure gradient is established across said fluid amplifier device.

3. Surface effect machine as claimed in claim 2, wherein said pressure sensor means comprises a pressure tap opening into a pressure fluid cushion to sense cushion pressure thereof.

4. Surface effect machine as claimed in claim 2, wherein said pressure sensor means comprises a pressure tap opening to the outside of said machine to sense aerodynamic pressure exerted thereon.

5. Surface effect machine as claimed in claim 2, wherein said pressure sensor means comprises both a pressure tap opening into a pressure fluid cushion to sense cushion pressure thereof and a further pressure tap opening to the outside of said machine to sense aerodynamic pressure exerted thereon, said pressure taps being mutually associated to have cumulative control effect on said fluid amplifier device.

6. Surface effect machine as claimed in claim 2, wherein said spaced pressure fluid cushions comprise at least two likewise acting cushions for lifting said machine above said surface and at least two oppositely-acting cushions for guiding said machine sideways of said surface, said fluid amplifier device comprising a fluid amplifier controlling the proportioning of supply fluid to said lifting cushions, and a further fluid amplifier controlling the proportioning of supply fluid to said guiding cushions.

7. Surface effect machine as claimed in claim 6, wherein both said fluid amplifiers are under the control of the same pressure sensor means.

8. Surface effect machine as claimed in claim 7, wherein said pressure sensor means comprises a pressure tap opening to the outside of said machine and sideways with respect to the direction of motion thereof, whereby said pressure tap senses aerodynamic pressure exerted transversely on said machine.

9. Surface effect machine as claimed in claim 2, wherein said spaced pressure fluid cushions comprise three cushions, one of which is positioned intermediate the other two, said cushions being associated respectively with three supply ducts branching from said junction, the inlet to that one of said ducts which is associated with said intermediate cushion being positioned intermediate the inlets of the other two ducts.

10. Surface effect machine as claimed in claim 2, wherein said spaced pressure fluid cushions comprise a plurality of cushions which are positioned in a generally circular cluster distribution and which are associated with respective supply ducts branching from said junction and said ducts having respective inlets positioned in a generally circular cluster distribution.

11. Surface effect machine as claimed in claim 10, wherein said plurality of cushions comprises four cushions at substantially 90° with each other, and said respective inlets comprising four in number and being disposed also at substantially 90° with each other.

References Cited

UNITED STATES PATENTS 3,174,569  3/1965  Eggington _____ 180—118

A. HARRY LEVY, *Primary Examiner.*

U.S. Cl. X.R.

104—134; 137—81.5